(12) United States Patent
Wang

(10) Patent No.: US 12,172,545 B2
(45) Date of Patent: Dec. 24, 2024

(54) VEHICLE BATTERY SWAPPING METHOD, BATTERY SWAPPING VAN, AND ELECTRONIC DEVICE

(71) Applicant: CONTEMPORARY AMPEREX TECHNOLOGY (HONG KONG) LIMITED, Hong Kong (CN)

(72) Inventor: Jinlong Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 224 days.

(21) Appl. No.: 17/831,355

(22) Filed: Jun. 2, 2022

(65) Prior Publication Data
US 2023/0065470 A1 Mar. 2, 2023

Related U.S. Application Data

(63) Continuation of application No. PCT/CN2021/114543, filed on Aug. 25, 2021.

(51) Int. Cl.
*H02J 7/00* (2006.01)
*B60L 53/80* (2019.01)
*H02J 7/14* (2006.01)

(52) U.S. Cl.
CPC ..................... *B60L 53/80* (2019.02)

(58) Field of Classification Search
CPC ....................................... B60L 53/80
(Continued)

(56) References Cited

U.S. PATENT DOCUMENTS 6,094,028 A * 7/2000 Gu ..................... H01M 10/441
320/109
9,187,004 B1 * 11/2015 Davis .................... B60L 53/30
(Continued)

FOREIGN PATENT DOCUMENTS

CN 110936846 A 3/2020
CN 111717063 A 9/2020
(Continued)

OTHER PUBLICATIONS

Contemporary Amperex Technology Co., Limited, International Search Report, PCT/CN2021/114543, Jun. 1, 2022, 9 pgs.
(Continued)

*Primary Examiner* — Alexis B Pacheco
(74) *Attorney, Agent, or Firm* — Kilpatrick Townsend & Stockton LLP

(57) ABSTRACT

This application relates to a vehicle battery swapping method. The method includes: connecting a positioning line of a battery swapping van to a predetermined reference point of a battery-to-be-swapped vehicle; obtaining a distance between a coordinate origin of a hoister of the battery swapping van and the reference point of the battery-to-be-swapped vehicle, and angles of the positioning line with respect to a travel direction, a longitudinal direction, and a vertical direction, respectively, of the battery-to-be-swapped vehicle; and determining, based on the obtained distance and angles, a moving track of an end effector of the hoister. This application further relates to a battery swapping van configured to swap a vehicle battery, an electronic device, and a computer-readable storage medium.

7 Claims, 5 Drawing Sheets

(58) Field of Classification Search
USPC .......................................................... 320/109
See application file for complete search history.

(56) References Cited

U.S. PATENT DOCUMENTS

| | | | |
|---|---|---|---|
| 10,022,867 B2* | 7/2018 | Saboo | G01C 21/3807 |
| 2010/0141206 A1* | 6/2010 | Agassi | H01M 50/204 |
| | | | 320/109 |
| 2016/0368464 A1* | 12/2016 | Hassounah | B60L 53/80 |
| 2017/0100837 A1* | 4/2017 | Zevenbergen | B60L 53/80 |
| 2017/0174092 A1 | 6/2017 | Kohnke | |
| 2017/0327091 A1* | 11/2017 | Capizzo | B64U 80/86 |
| 2019/0118782 A1* | 4/2019 | O'Hora | B60S 5/06 |
| 2020/0206962 A1* | 7/2020 | Sohmshetty | B60L 53/80 |
| 2021/0347275 A1* | 11/2021 | Chakraborty | G06Q 10/06315 |

FOREIGN PATENT DOCUMENTS

| | | |
|---|---|---|
| CN | 112068570 A | 12/2020 |
| CN | 112356732 A | 2/2021 |
| CN | 113291193 A | 8/2021 |
| KR | 20140123629 A | 10/2014 |
| KR | 20190017305 A | 2/2019 |
| WO | 2009086495 A2 | 7/2009 |
| WO | 2009086495 A3 | 7/2009 |
| WO | WO 2021/122459 A1 | 6/2021 |

OTHER PUBLICATIONS

The extended European search report for counterpart EP Application 21912342.9, mailed Apr. 18, 2023, 10 pages.

* cited by examiner

VEHICLE BATTERY SWAPPING METHOD, BATTERY SWAPPING VAN, AND ELECTRONIC DEVICE

CROSS-REFERENCE TO RELATED APPLICATION

This application is a continuation application of PCT Patent Application No. PCT/CN2021/114543, entitled "METHOD FOR REPLACING BATTERY OF VEHICLE, ELECTRIC VEHICLE AND ELECTRONIC DEVICE" filed on Aug. 25, 2021, which is incorporated herein by reference in its entirety.

TECHNICAL FIELD

This application relates to the technical field of vehicle charging, and in particular, to a vehicle battery swapping method, a battery swapping van, an electronic device, and a storage medium.

BACKGROUND

With the battery technology being increasingly mature, battery electric vehicles have been widely used as engineering transport vehicles, for example, for purposes of transportation in mining regions. To ensure the carrying efficiency of the vehicle, a battery of the vehicle needs to be swapped when the battery is in a low state of charge.

A work region of the engineering transport vehicle occupies a large area, and the work region of the vehicle is dispersive, making it costly to build charging piles and charging stations. Therefore, the battery of the vehicle is generally swapped by using a mobile battery swapping van. Currently, in swapping a battery, the low-state-of-charge battery in the vehicle needs to be removed by using a forklift, and then a battery in the battery swapping van is mounted into the vehicle. The process of swapping the battery using a forklift involves manual handling, and is prone to failure of mounting the battery in place. The location of the battery needs to be further adjusted manually, which is time-consuming and labor-intensive. In addition, due to a complex environment and heavy dust in the work region, problems such as signal interference and low visibility are prone to arise. Therefore, the existing global positioning system (GPS) or image technology is unable to accurately position the vehicle and the battery swapping van. Consequently, an automatic transit and mounting device is unable to determine the mounting location of the battery accurately, thereby restricting the use of the automatic transit and mounting device in the battery swapping van.

SUMMARY

In view of the above disadvantages in the prior art, an objective of this application is to provide a vehicle battery swapping method and a battery swapping van to implement precise positioning during battery swapping, and improve efficiency of the battery swapping.

To achieve the above objective, a first aspect of this application provides a vehicle battery swapping method. The method includes:

connecting a positioning line of a battery swapping van to a predetermined reference point of a battery-to-be-swapped vehicle;

obtaining a distance between a coordinate origin of a hoister of the battery swapping van and the reference point of the battery-to-be-swapped vehicle, and angles of the positioning line with respect to a travel direction, a longitudinal direction, and a vertical direction, respectively, of the battery-to-be-swapped vehicle; and determining, based on the obtained distance and angles, a moving track of an end effector of the hoister, where the moving track is used to be provided to the end effector of the hoister so that the end effector replaces a first battery of the battery-to-be-swapped vehicle with a second battery based on the moving track.

The position of the coordinate origin of the hoister of the battery swapping van with respect to the reference point of the battery-to-be-swapped vehicle is obtained by using the positioning line. In this way, the position of the hoister with respect to the battery-to-be-swapped vehicle can be determined accurately, thereby determining the moving track of the hoister and implementing automatic, accurate, and efficient battery swap operations.

In some embodiments, the method further includes: removing, after determining the moving track of the end effector of the hoister, the positioning line from the battery-to-be-swapped vehicle. By removing the positioning line, the determined moving track can be prevented from being changed due to the movement of the reference point in a battery swap process.

In another embodiment, the method further includes: determining, based on a location of the end effector of the hoister with respect to the first battery, whether the end effector is moved in place with respect to the first battery. The step of determining whether the end effector is moved in place with respect to the first battery ensures that the end effector can accurately grip the first battery.

In some embodiments, the method includes: correcting the moving track of the end effector of the hoister based on an image of a mounting location, where the image of the mounting location is an image of a location of the second battery with respect to the battery-to-be-swapped vehicle and is obtained by an imaging device. The image of the location of the second battery with respect to the battery-to-be-swapped vehicle is obtained, and is compared with an image of the location of the battery mounted in place in the battery-to-be-swapped vehicle. The moving track of the end effector of the hoister is subjected to feedback correction based on a comparison result to more accurately mount the second battery into the battery-to-be-swapped vehicle.

In another embodiment, the method further includes: conveying the first battery to a stow location of the battery swapping van, and conveying the second battery to a battery swapping window of the battery swapping van. By conveying the first battery and the second battery, the first battery and the second battery can be automatically managed and invoked, thereby improving the efficiency of battery swapping.

A second aspect of this application provides a battery swapping van for swapping a vehicle battery. The battery swapping van includes:

a hoister, including an end effector adapted to clamp a first battery and a second battery;

a positioning line, where one end of the positioning line is located at a coordinate origin of the hoister;

a positioning unit, configured to measure a distance along the positioning line and angles of the positioning line with respect to a travel direction, a longitudinal direction, and a vertical direction, respectively, of a battery-to-be-swapped vehicle; and a processor, configured to receive the distance and angles measured by the positioning unit, and determine, based on the obtained distance and angles, a moving track of the end effector of the hoister, and cause the end effector to move based on the moving track.

The battery swapping van according to the second aspect of this application can implement accurate positioning of the coordinate origin of the hoister with respect to the battery-to-be-swapped vehicle, thereby performing a battery swap operation automatically and accurately.

In some embodiments, an imaging device is disposed at the end effector of the hoister. The imaging device is configured to obtain an image of a location of the second battery with respect to the battery-to-be-swapped vehicle.

In some embodiments, the battery swapping van further includes a battery conveyance unit. The battery conveyance unit includes an actuation mechanism and a support element. The actuation mechanism is configured to actuate the support element to move so that the first battery is conveyed to a stow location, and that the second battery is conveyed to a battery swapping window.

In some embodiments, a location sensor is disposed at the end effector of the hoister. The location sensor is configured to detect a location of the end effector of the hoister with respect to the first battery in the battery-to-be-swapped vehicle.

A third aspect of this application provides an electronic device, including: a processor, and a memory configured to store an instruction executable by the processor. The processor is configured to invoke the instruction stored in the memory, to perform the battery vehicle swapping method according to the first aspect.

A fourth aspect of this application provides a computer-readable storage medium on which a computer instruction is stored. When executing the computer instruction, the processor is caused to perform the battery vehicle swapping method according to the first aspect.

Compared with the prior art, this application possesses the following advantages:

In this application, by using the positioning line, the coordinate origin of the hoister of the battery swapping van is connected to the reference point of the battery-to-be-swapped vehicle, thereby avoiding problems such as inaccurate positioning in the GPS and the image technology caused by low visibility, signal interference, and other reasons, so as to implement precise positioning of the battery swapping van and the battery-to-be-swapped vehicle. Therefore, automatic, accurate, and efficient battery swap operations can be performed by using the hoister.

BRIEF DESCRIPTION OF DRAWINGS

To describe the technical solutions in this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION OF EMBODIMENTS

Figure 1:
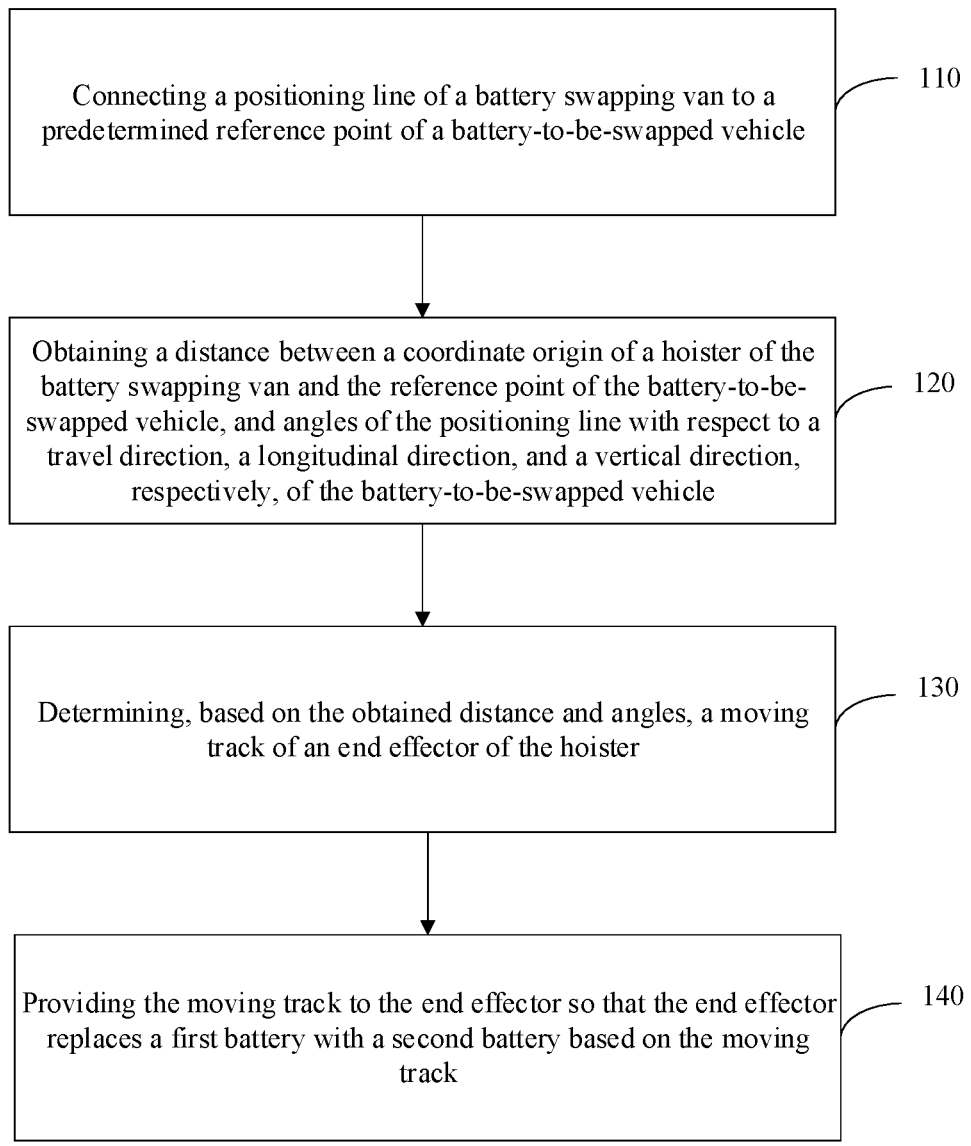
FIG. 1 illustrates a flowchart of a vehicle battery swapping method according to an embodiment of this application.

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

Unless otherwise defined, all technical and scientific terms used herein have the same meanings as usually understood by a person skilled in the technical field of this application. The terms used herein are merely intended for describing specific embodiments but are not intended to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish different objects but not intended to indicate or imply relative importance or implicitly specify the number of the indicated technical features, the specific order, or order of priority. In the description of the embodiments of this application, unless otherwise expressly specified, "a plurality of" means two or more.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components, or understood as a physical connection or virtual connection. A person of ordinary skill in the art understands the specific meanings of the terms in the embodiments of this application according to the context.

Currently, as can be seen from the market trend, the application of power batteries is increasingly extensive. Power batteries are not only used in passenger vehicles, but also widely used in commercial vehicles, such as engineering vehicles and mining vehicles. With the wide use of power batteries, more attention has been paid to how to quickly and accurately swap a power battery.

For a passenger vehicle, the power battery used therein is characterized by a small capacity and a low weight, and the operating environment of the passenger vehicle is relatively simple and fixed. Generally, for the passenger vehicle, charging stations may be constructed to swap the power battery, or charging piles may be constructed for charging the battery, or even a driver may replace the power battery manually. However, for commercial vehicles, especially engineering vehicles and mining vehicles, the work regions of the vehicles occupy a large area, and are dispersive, without following a fixed operating route. The commercial vehicles are generally unable to make full use of the fixed charging piles and charging stations, and need to swap batteries by using a mobile battery swapping van. In view of the capacity and weight of the battery, the battery is not manually swappable, but needs to be transported by a forklift, and then the mounting location of the battery needs to be further adjusted manually, which is time-consuming and labor-intensive. In addition, due to a complex environment and heavy dust in the work region, problems such as signal interference and low visibility are prone to arise. Therefore, the existing GPS or image technology is unable to accurately position the vehicle and the battery swapping van. Consequently, an automatic transit and mounting device is unable to determine the mounting location of the battery accurately, thereby restricting the use of the automatic transit and mounting device in the battery swapping van.

To quickly and accurately swap the battery of the vehicle, it is expected that the vehicle can be accurately positioned by means of a positioning line, and that the battery swap operation can be automatically performed by using a hoister.

A vehicle battery swapping method disclosed in the embodiments of this application may be used, but is not limited to be used, for commercial vehicles, passenger vehicles, and the like.

Figure 2:
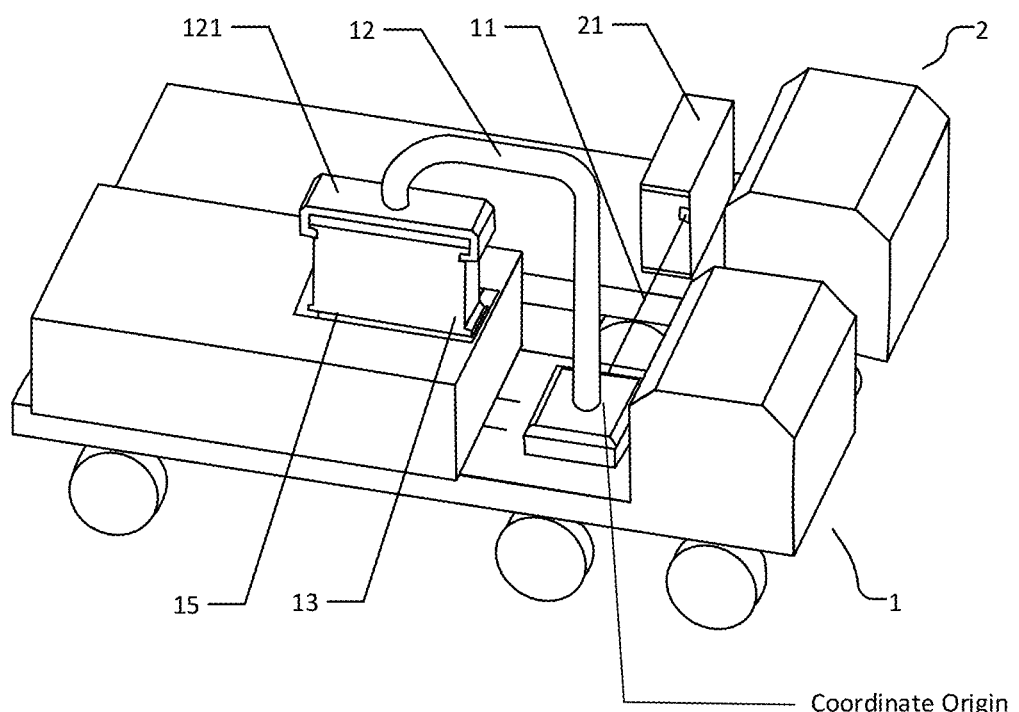
FIG. 2 is a schematic structural diagram of a battery swapping van located in a battery swap position and a battery-to-be-swapped vehicle according to an embodiment of this application.
Figure 3:
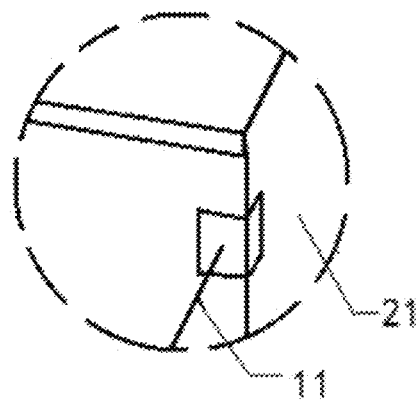
FIG. 3 is a local enlarged view of a joint between a positioning line and a battery-to-be-swapped vehicle according to an embodiment of this application.
Figure 4:
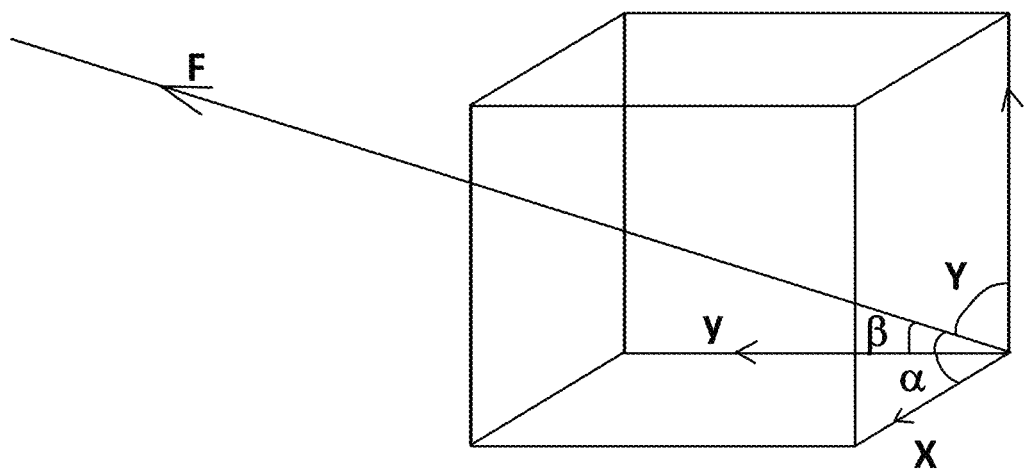
FIG. 4 illustrates a schematic measurement diagram of a positioning line according to an embodiment of this application.

According to some embodiments of this application, refer to FIG. 1 and further refer to FIG. 2 to FIG. 4. FIG. 1 is a flowchart of a vehicle battery swapping method according to an embodiment of this application; FIG. 2 is a schematic structural diagram of a battery swapping van located in a battery swap position and a battery-to-be-swapped vehicle according to an embodiment of this application; FIG. 3 is a local enlarged view of a joint between a positioning line and a battery-to-be-swapped vehicle according to an embodiment of this application; and FIG. 4 is a schematic measurement diagram of a positioning line according to an embodiment of this application. An embodiment of this application provides a vehicle battery swapping method. When a battery in a vehicle is in a low state of charge, the vehicle sends a battery swap request. After receiving the battery swap request, a console sends the battery swap request to a battery swapping van 1. The battery swapping van 1 moves to a battery swap position. The console is capable of dispatching, and is configured to receive a signal and send an instruction. Generally, the console may be a remote server, a mobile device, a dispatching room, or the like. For ease of description herein, a vehicle with a battery to be swapped out is referred to as a battery-to-be-swapped vehicle 2, and the battery that needs to be swapped out in the battery-to-be-swapped vehicle 2 is referred to as a first battery 21. Understandably, the battery swap position is a location near the battery-to-be-swapped vehicle 2, for example, a location that is approximately 1 to 2 meters distant from the battery-to-be-swapped vehicle 2. In addition, after receiving the battery swap request, the console may first determine the location of the battery swapping van 1, and then send the battery swap request to the battery swapping van 1 closest to the battery-to-be-swapped vehicle 2.

As shown in FIG. 1, in step 110, a positioning line 11 of a battery swapping van 1 is connected to a predetermined reference point of a battery-to-be-swapped vehicle 2. The positioning line 11 may be a physical connection line or a virtual connection line, one end of which is located at a coordinate origin of a hoister 12 of the battery swapping van 1, and the other end of which is connected to the predetermined reference point of the battery-to-be-swapped vehicle 2. For example, the hoister 12 may be an industrial robot. The coordinate origin of the hoister may be an origin of a base coordinate system (a rectangular coordinate system designed to describe a robot body movement, benchmarked against an installation pedestal) of the industrial robot. The predetermined reference point of the battery-to-be-swapped vehicle 2 may be located on a positioning reference block (see FIG. 3) of a battery pack frame of the first battery 21, and all batteries have the same positioning reference point.

In step 120, a distance between a coordinate origin of a hoister 12 of the battery swapping van 1 and the reference point of the battery-to-be-swapped vehicle 2, and angles of the positioning line 11 with respect to a travel direction x, a longitudinal direction y, and a vertical direction z, respectively, of the battery-to-be-swapped vehicle 2, are obtained. In an embodiment, the positioning line 11 is a tensile physical connection line. A force F on the positioning line 11 may be measured by a force sensor. In addition, an angle $\alpha$ of the positioning line 11 with respect to the travel direction x, an angle $\beta$ of the positioning line with respect to the longitudinal direction y, and an angle $\gamma$ of the positioning line with respect to the vertical direction z, respectively, of the battery-to-be-swapped vehicle 2, are obtained, as shown in FIG. 4. The force F on the positioning line 11 may be converted into an elongation to determine the distance between the coordinate origin of the hoister 12 of the battery swapping van 1 and the reference point of the battery-to-be-swapped vehicle 2. Alternatively, the positioning line 11 may be a virtual connection line. For example, the positioning line 11 is a laser ray. Therefore, the distance between the coordinate origin of the hoister 12 of the battery swapping van 1 and the reference point of the battery-to-be-swapped vehicle 2 can be obtained by using an instrument such as a laser rangefinder, and the angles of the positioning line 11 with respect to the x-direction, y-direction, and z-direction, respectively, can be obtained by using a laser goniometer. In addition, the obtained distance between the coordinate origin of the hoister 12 of the battery swapping van 1 and the reference point of the battery-to-be-swapped vehicle 2 will be decomposed into components in the x-direction, y-direction, and z-direction, respectively, for ease of subsequent calculation.

In step 130, a moving track P of an end effector 121 of the hoister 12 is determined based on the obtained distance and angles. For example, the hoister 12 may be an industrial robot, and the end effector 121 may be a hand of the industrial robot, and is configured to perform specific tasks such as directly gripping a component. In the illustrated embodiment, the end effector 121 is a gripper capable of gripping a battery. Specifically, an initial moving track $P_0$ of the end effector 121 of the hoister 12 is calculated first, and the initial moving track $P_0$ is stored in the memory. For example, when the positioning line 11 is a tensile physical connection line, at an initial location, known values are the force $F_0$ on the positioning line 11, the angle $\alpha_0$ of the positioning line 11 with respect to the x-direction, the angle $\beta_0$ of the positioning line 11 with respect to the y-direction, and the angle $\gamma_0$ of the positioning line with respect to the z-direction. That is, a terminal pose of the end effector 121 is known. Therefore, the initial moving track $P_0$ ($F_0$, $\alpha_0$, $\beta_0$, $\gamma_0$) of the end effector 121 can be calculated by using a robot kinematics inverse solution. Understandably, when the terminal pose of the end effector is known, how to solve the moving track of the end effector by using the robot kinematics inverse solution is well known in the prior art, and is not described in detail here. At the battery swap position, the force $F_1$ on the positioning line 11, the angle $\alpha_1$ of the positioning line 11 with respect to the x-direction, the angle $\beta_1$ of the positioning line with respect to the y-direction, and the angle $\gamma_1$ of the positioning line with respect to the z-direction are obtained. Therefore, P ($F_1$, $\alpha_1$, $\beta_1$, $\gamma_1$)=P ($F_0+\Delta F$, $\alpha_0+\Delta\alpha$, $\beta_0+\Delta\beta$, $\gamma_0+\Delta\gamma$), where $\Delta F=F_1-F_0$, $\Delta\alpha=\alpha_1-\alpha_0$, $\Delta\beta=\beta_1-\beta_0$, $\Delta\gamma=\gamma_1-\gamma_0$. Therefore, at the battery swap position, by obtaining the force $F_1$ on the positioning line 11, the angle $\alpha_1$ of the positioning line 11 with respect to the x-direction, the angle $\beta_1$ of the positioning line with respect to the y-direction, and the angle $\gamma_1$ of the positioning line with respect to the z-direction, increments by which $F_1$, $\alpha_1$, $\beta_1$, and $\gamma_1$ are greater than $F_0$, $\alpha_0$, $\beta_0$, and $\gamma_0$ are obtained respectively, so that the moving track P at the battery swap position can be determined based on the initial moving track $P_0$. So far, the position of the battery swapping van 1 with respect to the battery-to-be-swapped vehicle 2 has been determined. That is, the moving track P of the end effector 121 has been determined.

In step 140, the moving track P is provided to the end effector 121 of the hoister 12 so that the end effector 121 replaces a first battery 21 of the battery-to-be-swapped vehicle 2 with a second battery 13 based on the moving track P. In an embodiment, the processor provides the moving track P to a controller of the hoister 12. After receiving the moving track P, the controller controls the end effector 121 to move based on the moving track P. Specifically, the end effector 121 grips the first battery 21 first, and removes the first battery from the battery-to-be-swapped vehicle 2. Then the end effector 121 grips the second battery 13 and hoists and mounts the second battery 13 to the battery-to-be-swapped vehicle 2 based on the moving track P.

The position of the coordinate origin of the hoister 12 of the battery swapping van 1 with respect to the reference point of the battery-to-be-swapped vehicle 2 is obtained by using the positioning line 11. In this way, the position of the hoister 12 with respect to the battery-to-be-swapped vehicle 2 can be determined accurately, thereby determining the moving track of the hoister 12 and implementing automatic, accurate, and efficient battery swap operations.

Figure 5:
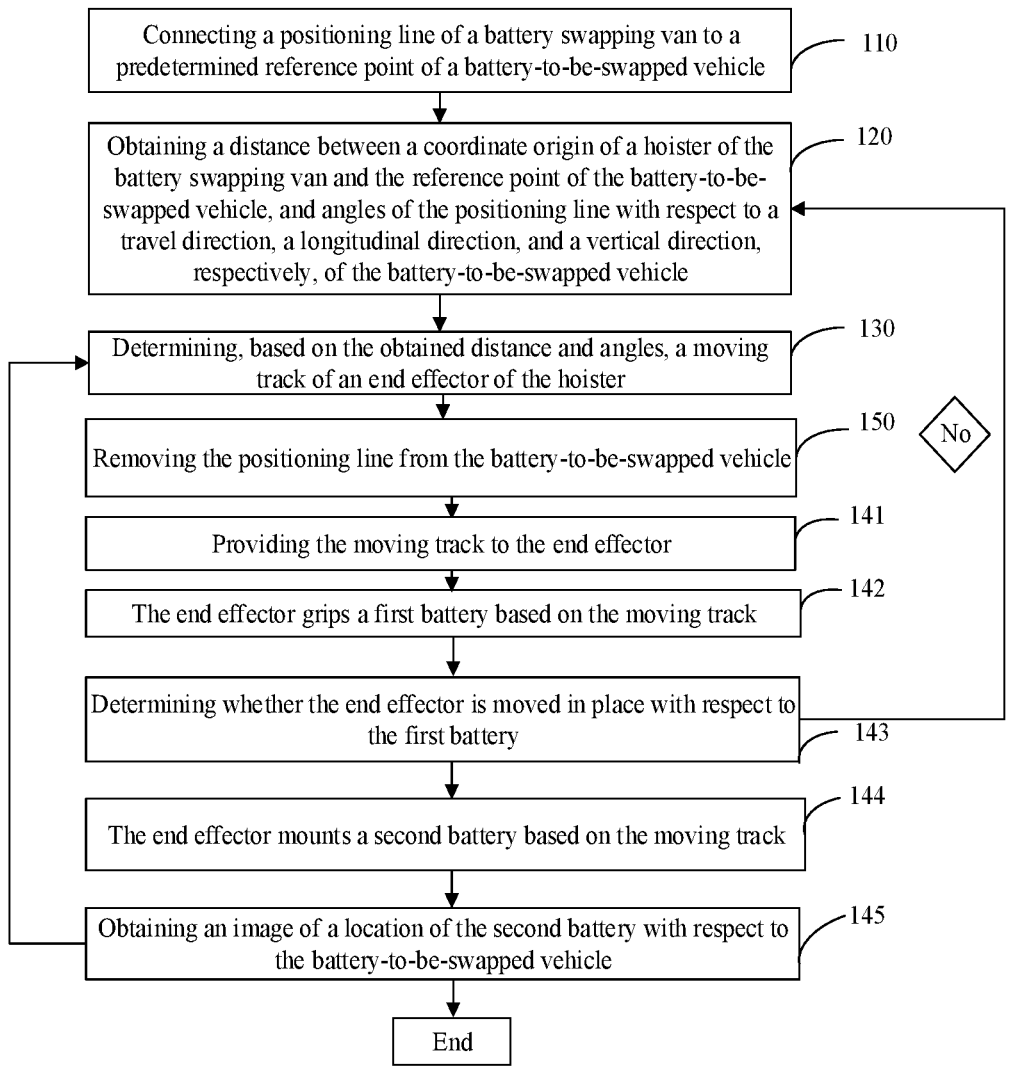
FIG. 5 illustrates a flowchart of a vehicle battery swapping method according to some embodiments of this application.

Referring to FIG. 5, FIG. 5 shows a flowchart of a vehicle battery swapping method according to some embodiments of this application. According to some embodiments of this application, after step 130, the positioning line 11 may be removed from the battery-to-be-swapped vehicle 2 in step 150 to get ready for a battery swap operation. Alternatively, when the positioning line 11 is not removed from the battery-to-be-swapped vehicle 2, step 140 may be performed by stopping obtaining the distance between the coordinate origin of the hoister 12 of the battery swapping van 1 and the reference point of the battery-to-be-swapped vehicle 2 as well as the angles of the positioning line 11 with respect to the travel direction x, the longitudinal direction y, and the vertical direction z, respectively, of the battery-to-be-swapped vehicle 2.

After the moving track P of the end effector 121 has been determined, that is, after step 130, interference to the determined moving track can be avoided by removing the positioning line 11.

According to some embodiments of this application, step 140 may further include the following steps: step 141: providing the moving track P to the end effector 121; step 142: the end effector 121 grips the first battery 21 based on the moving track P; step 143: determining whether the end effector 121 is moved in place with respect to the first battery 21; and step 144: the end effector 121 mounts the second battery 13 based on the moving track P.

In step 143, based on the location of the end effector 121 of the hoister 12 with respect to the first battery 21, it may be determined whether the end effector 121 is moved in place with respect to the first battery 21. If the end effector is moved in place, the process goes to step 144; if the end effector is not moved in place, the process returns to step 120 to re-obtain the distance between the coordinate origin of the hoister 12 of the battery swapping van 1 and the reference point of the battery-to-be-swapped vehicle 2, and angles of the positioning line 11 with respect to the travel direction x, the longitudinal direction y, and the vertical direction z, respectively, of the battery-to-be-swapped vehicle 2, so as to ensure the end effector 121 to accurately grip the first battery 21.

The step of determining whether the end effector 121 is moved in place with respect to the first battery 21 ensures that the end effector can accurately grip the first battery 21, and also ensures accuracy of the moving track P of the end effector 121.

According to some embodiments of this application, step 140 may further include the following step: step 145: obtaining an image of a location of the second battery 13 with respect to the battery-to-be-swapped vehicle 2. Specifically, the image of the location of the second battery 13 with respect to the battery-to-be-swapped vehicle 2, that is, an image of a mounting location, may be obtained by using an imaging device. The moving track P of the end effector 121 of the hoister 12 is corrected based on the image of the mounting position. For example, the obtained image of the location of the second battery 13 with respect to the battery-to-be-swapped vehicle 2 is compared with an image of the location of the battery mounted in place in the battery-to-be-swapped vehicle 2. If a comparison result shows that a deviation between the two images is within an allowed range, the mounting of the second battery 13 is continued. If the comparison result shows that the deviation between the two images is beyond the allowed range, the moving track P of the end effector 121 needs to be adjusted.

The moving track of the end effector 121 of the hoister 12 is subjected to feedback correction by using the obtained image of the location of the second battery 13 with respect to the battery-to-be-swapped vehicle 2, thereby ensuring that the second battery is accurately mounted in the battery-to-be-swapped vehicle.

In some embodiments of this application, the method may further include: conveying the first battery 21 to a stow location of the battery swapping van 1, and conveying the second battery 13 to a battery swapping window 15 of the battery swapping van 1. After gripping the first battery 21, the end effector 121 hoists the first battery 21 onto the battery swapping van 1. After it is confirmed that the first battery 21 is placed in place, the first battery 21 is conveyed to the stow location by a battery conveyance unit 14 in the battery swapping van 1. Subsequently, the second battery 13 is conveyed to a battery swapping window 15 through the battery conveyance unit 14, so as to be available for being gripped by the end effector 121 and mounted onto the battery-to-be-swapped vehicle 2.

By conveying the first battery and the second battery, the first battery and the second battery can be automatically managed and invoked, thereby improving the efficiency of battery swapping.

According to another aspect of this application, this application further provides a battery swapping van for swapping a vehicle battery.

Figure 6:
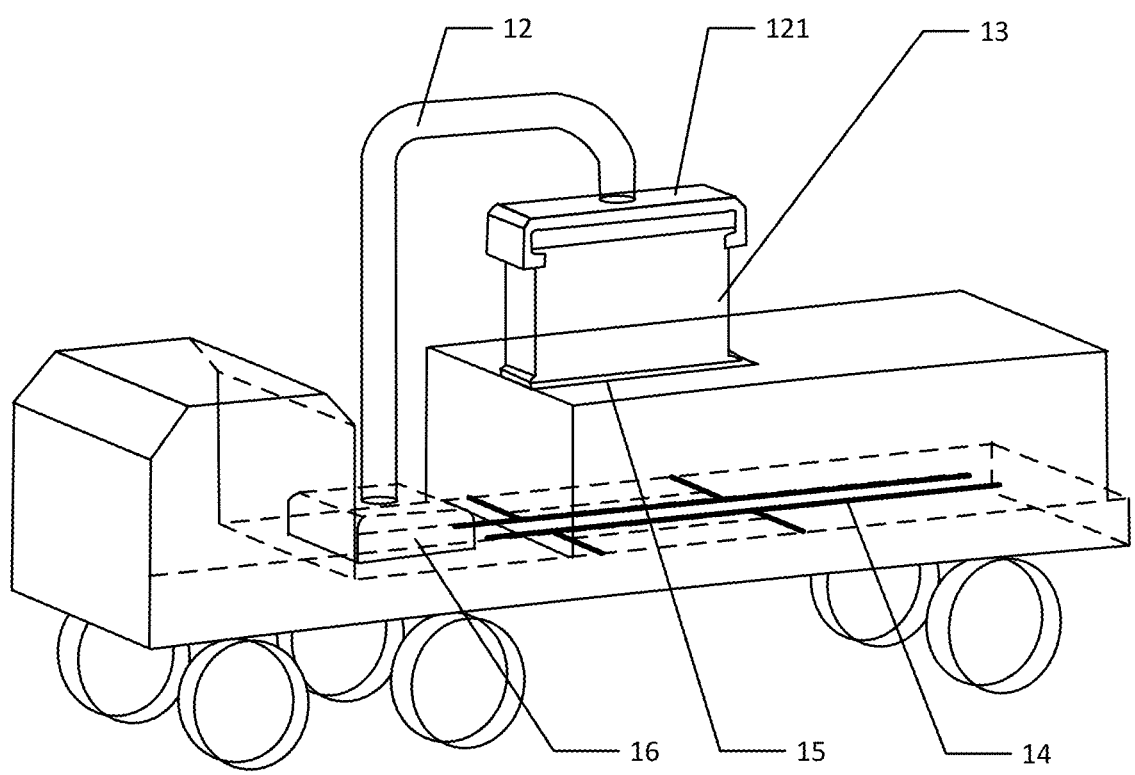
FIG. 6 illustrates a schematic structural diagram of a battery swapping van configured to swap a vehicle battery according to an embodiment of this application.

FIG. 6 shows a battery swapping van for swapping a vehicle battery. As shown in FIG. 6, the battery swapping van 1 includes: a positioning line 11 (not shown in FIG. 6), a hoister 12, a second battery 13, a processor 101 (not shown in FIG. 6), and a positioning unit 16. Specifically, the hoister 12 includes an end effector 121 adapted to clamp a first battery 21 and a second battery 13. One end of the positioning line 11 is located at a coordinate origin of the hoister 12, and the other end is connected to a preset reference point of the battery-to-be-swapped vehicle 2. The positioning unit 16 is disposed in a pedestal of the hoister 12, and is configured to measure a distance along the positioning line 11 and angles of the positioning line 11 with respect to a travel direction x, a longitudinal direction y, and a vertical direction z, respectively, of a battery-to-be-swapped vehicle 2. The positioning unit 16 includes, but is not limited to, a location sensor, a force sensor, and an angle sensor. The processor 101 is configured to receive the distance and angles measured by the positioning unit 16, and determine, based on the obtained distance and angles, a moving track P of the end effector 121 of the hoister 12, and cause the end effector 121 to move based on the moving track P, so as to replace the first battery 21 with the second battery 13. The hoister 12 may be a robotic arm. The end effector 121 of the hoister can perform translational movement in the x-direction and the y-direction, and can rotate around the z-direction.

The position of the coordinate origin of the hoister 12 of the battery swapping van 1 with respect to the reference point of the battery-to-be-swapped vehicle 2 can be accurately obtained by using the positioning line 11 of the battery swapping van 1, and the hoister 12 can perform battery swap operations accurately, automatically, and efficiently.

According to some embodiments of this application, an imaging device may be disposed at the end effector 121 of the hoister 12. The imaging device is configured to obtain an image of a location of the second battery 13 with respect to the battery-to-be-swapped vehicle 2, and send the obtained image of the location to the processor 101. The processor 101 compares the obtained image of the location with an image of the location of the battery mounted in place, and determines whether a deviation of the location of the second battery 13 with respect to the battery-to-be-swapped vehicle 2 falls within an allowable range.

With the imaging device disposed, image data of the location of the second battery 13 with respect to the battery-to-be-swapped vehicle 2 can be obtained during a battery swap operation. The data is fed back to the processor 101 to correct the moving track P, thereby forming closed-loop control on the end effector.

In some embodiments of this application, the battery swapping van 1 may further include a battery conveyance unit 14. The battery conveyance unit 14 may include an actuation mechanism and a support element. The actuation mechanism may be a motor, and the support element may be a roller. The roller is arranged along a conveyance rail. When the motor drives the roller to rotate, the first battery 21 can be conveyed to a stow location, and the second battery 13 can be conveyed to a battery swapping window 15. The battery conveyance unit 14 may be configured to communicate with the processor 101 to automatically convey the battery.

With the battery conveyance unit 14 provided, the first battery and the second battery can be automatically managed and invoked, thereby improving the efficiency of battery swapping.

According to some embodiments of this application, a location sensor may be disposed at the end effector 121 of the hoister 12. The location sensor is configured to detect a location of the end effector 121 of the hoister 12 with respect to the first battery 21 in the battery-to-be-swapped vehicle 2, so as to determine whether the end effector 121 is moved in place with respect to the first battery 21.

The disposed location sensor ensures that the end effector 121 accurately grips the first battery 21, and also ensures accuracy of the moving track.

Figure 7:
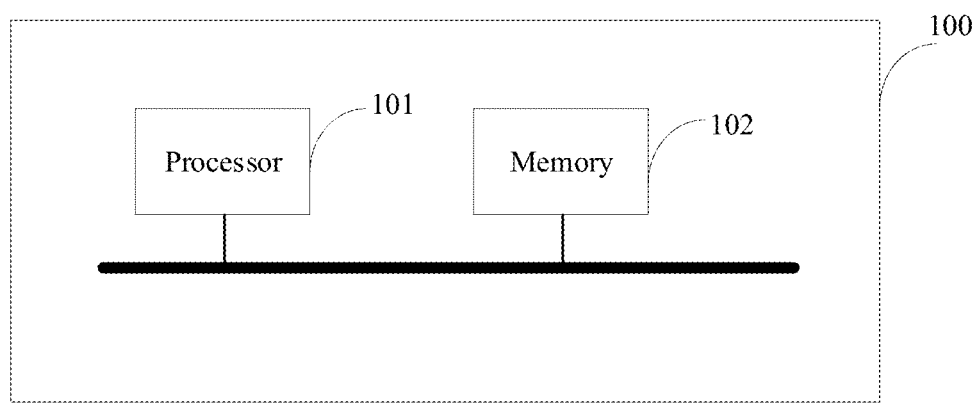
FIG. 7 illustrates a schematic diagram of an electronic device according to an embodiment of this application.

In addition, an embodiment of this application further provides an electronic device. As shown in FIG. 7, the electronic device 100 includes: a processor 101; and a memory 102 communicationally connected to the processor 101. The memory 102 stores an instruction executable by the processor 101. When the instruction is executed by the processor 101, the instruction enables the processor 101 to perform the vehicle battery swapping method according to the embodiments of this application.

The processor 101 is electrically connected to the memory 102 directly or indirectly to transmit or exchange data. For example, such components may be electrically connected to each other by one or more communications buses or signal buses. The method for correcting a state of charge of the battery includes at least one software function module that can be stored in the memory 102 in the form of software or firmware.

The processor 101 may be an integrated circuit chip capable of processing signals. The processor 101 may be a general-purpose processor, such as a central processing unit (CPU) or a network processor (NP); or may be a digital signal processor, an application-specific integrated circuit, a field programmable gate array or other programmable logical device, a discrete gate or a transistor logical device, or a discrete hardware component. The processor can implement or perform the methods, steps, and logical block diagrams disclosed in the embodiments of this application. The general-purpose processor may be a microprocessor, or the processor may be any conventional processor or the like.

The memory 102 may store various software programs and modules, such as program instructions or modules corresponding to the vehicle battery swapping method and device according to the embodiments of this application. By running the software programs and modules stored in the memory 102, the processor 101 performs various functionalities and data processing, that is, implements the method according to the embodiments of this application.

The memory 102 may be, but is not limited to, a RAM (random access memory, random access memory), a read-only memory (ROM), a programmable read-only memory (PROM), an erasable programmable read-only memory (EPROM), an electric erasable programmable read-only memory (EEPROM), or the like.

Although this application has been described with reference to exemplary embodiments, various improvements may be made to the embodiments without departing from the scope of this application, and the components therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A vehicle battery swapping method, comprising:
   connecting a positioning line of a battery swapping van to a predetermined reference point of a battery-to-be-swapped vehicle, wherein the positioning line is a tensile physical connection line;
   measuring a force on the positioning line and obtaining a distance between a coordinate origin of a hoister of the battery swapping van and the reference point of the battery-to-be-swapped vehicle based on the force, and obtaining angles of the positioning line with respect to a travel direction, a longitudinal direction, and a vertical direction, respectively, of the battery-to-be-swapped vehicle;
   determining, based on the obtained distance and angles, a moving track of an end effector of the hoister, wherein the end effector of the hoister replaces a first battery of the battery-to-be-swapped vehicle with a second battery based on the moving track above the vehicle; and
   correcting the moving track of the end effector of the hoister based on an image of a mounting location, wherein the image of the mounting location is an image of a location of the second battery with respect to the battery-to-be-swapped vehicle and is obtained by an imaging device.

2. The method according to claim 1, further comprising: removing, after determining the moving track of the end effector of the hoister, the positioning line from the battery-to-be-swapped vehicle.

3. The method according to claim 1, further comprising: determining, based on a location of the end effector of the hoister with respect to the first battery, whether the end effector is moved in place with respect to the first battery.

4. The method according to claim 1, further comprising: conveying the first battery to a stow location of the battery swapping van, and conveying the second battery to a battery swapping window of the battery swapping van.

5. A battery swapping van for swapping a vehicle battery, wherein the battery swapping van comprises:
   a hoister, comprising an end effector adapted to clamp a first battery and a second battery;
   a positioning line, wherein one end of the positioning line is located at a coordinate origin of the hoister, and the positioning line is a tensile physical connection line;
   a positioning unit comprising a force sensor and an angle sensor, wherein the force sensor is configured to measure a force on the positioning line and determine a distance along the positioning line based on the force, and the angle sensor is configured to measure angles of the positioning line with respect to a travel direction, a longitudinal direction, and a vertical direction, respectively, of a battery-to-be-swapped vehicle;
   a processor, configured to receive the distance and angles measured by the positioning unit, and determine, based on the obtained distance and angles, a moving track of the end effector of the hoister, and cause the end effector to move based on the moving track above the vehicle; and
   an imaging device is disposed at the end effector of the hoister, and the imaging device is configured to obtain an image of a location of the second battery with respect to the battery-to-be-swapped vehicle.

6. The battery swapping van according to claim 5, further comprising: a battery conveyance unit, the battery conveyance unit comprises an actuation mechanism and a support element, the actuation mechanism is configured to actuate the support element to move so that the first battery is conveyed to a stow location, and that the second battery is conveyed to a battery swapping window.

7. The battery swapping van according to claim 5, wherein a location sensor is disposed at the end effector of the hoister, and the location sensor is configured to detect a location of the end effector of the hoister with respect to the first battery in the battery-to-be-swapped vehicle.

* * * * *